United States Patent [19]

Akers et al.

[11] 4,259,251

[45] Mar. 31, 1981

[54] TREATMENT OF EFFLUENT

[75] Inventors: John B. Akers, Bebington; David C. Peters, Heswall, both of England

[73] Assignee: Internationale Octrooi Maatschappij "Octropa" B.V., Rotterdam, Netherlands

[21] Appl. No.: 119,225

[22] Filed: Feb. 7, 1980

[30] Foreign Application Priority Data

Feb. 14, 1979 [GB] United Kingdom ................ 5290/79

[51] Int. Cl.³ .......................... C11B 13/00; C11B 1/10
[52] U.S. Cl. .............................. 260/412.5; 260/412.8; 260/417; 210/638; 210/702
[58] Field of Search ................. 260/412.5, 412.8, 417; 210/21, 42 R, 51, 56

[56] References Cited

U.S. PATENT DOCUMENTS

| | | | |
|---|---|---|---|
| 2,755,293 | 7/1956 | McDonald | 260/412.5 |
| 3,696,133 | 10/1972 | Lloyd et al. | 260/412.8 |
| 3,983,147 | 9/1976 | Senda et al. | 260/412.8 |

*Primary Examiner*—John F. Niebling
*Attorney, Agent, or Firm*—Barry Kramer

[57] ABSTRACT

A process for the production of fatty acid soaps from sludge, especially sewage sludge, comprises extracting sludge having a solids content of at least 15% by weight with a non-polar solvent to provide an extract containing fatty matter, and subsequently saponifying the fatty matter in the presence of a dipolar aprotic solvent having a dielectric constant of at least 15 to produce fatty acid soaps.

10 Claims, No Drawings

TREATMENT OF EFFLUENT

The invention relates to a process for the treatment of sludge in order to produce therefrom fatty acid soaps. The term "sludge" means aqueous waste products such as domestic sewage and industrial wastes and effluents as would normally be received at a sewage or effluent treatment works, and includes crude, activated sludge and digested sludge.

Sludge is a complex mixture of materials such as cellulosics, proteinaceous materials, vitamins, metals, phosphates, nitrogenous materials, hydrocarbon materials and degradation products of detergents and polysaccharides, as are commonly present in effluents, as well as fatty matter and other organic substances. It has long been realised that since sludge contains such valuable material, it would be desirable to recover and re-use at least the fatty matter present in the sludge, if a technically and economically feasible extraction process could be devised.

At times of economic crisis, particularly during wartime, schemes have been examined for the separation from sludge of fatty matter (also referred to in the technical literature as "grease"). These experimental schemes have generally involved the flocculation of solids present in effluents, and saponification of the flocculated solids to yield crude soap, but it has hitherto been impossible to devise an economic process for use on an industrial scale which will yield purified fatty acid soaps by such methods.

It has now been discovered that by selection of a special organic non-polar solvent, fatty matter can be readily and economically extracted and isolated from sludge in a degree of purity not hitherto achieved, and thereafter converted into fatty acid soaps.

Accordingly, there is provided a process for the production of fatty acid soaps from sludge, which comprises the steps of:

(i) extracting sludge, having a solids content of at least 15% by weight, with a non-polar solvent to provide an extract comprising fatty matter; and (ii) saponifying the fatty matter in the presence of a dipolar aprotic solvent to produce fatty acid soaps.

The sludge can accordingly be crude (or primary) sludge which has been obtained after allowing solid particles in the effluent as received at the sewage works to settle, or it can be sludge which has been aerated at the sewage works and known as activated (or secondary) sludge. Preferably, the sludge is co-settled sludge which is a mixture of settled activated sludge and settled crude sludge. It is further preferred to employ cosettled sludge, since the process of the invention can readily be adapted for use with conventional sewage treatment water operations.

The sludge, whether crude, activated or mixed, will normally have a solids content of up to about 5% by weight and, if so, it is first necessary, before commencing extraction, to consolidate the sludge to provide dewatered sludge having a higher solids content. Although theoretically it is possible to consolidate sludge to provide a dewatered sludge having a solids content of close to 100% solids, it is usual, for reasons of economy, to treat sludge to provide dewatered sludge having a solids content of at least 15%, preferably from 25 to 50% by weight.

Sludge can be consolidated to provide dewatered sludge by any of several alternative methods. Although these can include conventional drying methods to remove water by evaporation, it is generally recognised that the energy requirements for such methods would be excessively high, such that the process of the invention would be uneconomic to operate on an industrial scale. There are, however, two alternative economic methods which do not involve conventional drying techniques which can be employed for this purpose.

The first alternative method includes heating sludge to a temperature of at least 100° C., preferably at least 180° C. and more usually at about 200° C., and subsequently mechanically separating the heated sludge, for example by filtration or centrifugation, to provide dewatered sludge having a solids content of up to 50% by weight. It is apparent that this heating step, which will be under superatmospheric pressure at temperatures above 100° C., tends to rupture organic cellular matter normally present in sludge and thereby aids the subsequent separation of solids from water.

The second alternative method includes contacting sludge with a flocculating agent in order to flocculateparticles of solid matter present in sludge. The flocculated solids can then be separated by filtration or centrifugation to provide dewatered sludge having a solids content of up to 50% by weight.

Any suitable flocculating agent can be employed for this purpose, but it is preferred to use a cationic polyelectrolyte. ZETAG 92 is one example of such a polyelectrolyte. Alternative examples of flocculating agents are aluminum hydroxide, chloride or sulphate, and ferrous sulphate (COPPERAS) plus lime.

The amount of flocculating agent to be employed when this method of dewatering sludge is used can be that recommended by the manufacturer of the flocculating agent. However, by way of example, it can be stated that when ZETAG 92 is employed as the flocculating agent, it is preferred to use from 0.01% to 0.5%, preferably from 0.025 to 0.4% by weight, of this polyelectrolyte, based on the dry solids content of the sludge.

The non-polar solvent to be employed in the process of the invention for the extraction of fatty matter from sludge is a water-immiscible non-polar solvent which is normally liquid at 20° C. and which has a boiling point of not greater than 200° C.

Examples of suitable non-polar solvents are aliphatic or aromatic hydrocarbons having from 4 to 14 carbon atoms in the molecule.

When the non-polar solvent is an aliphatic hydrocarbon, preferably it has the general formula $C_nH_{2n+2}$, where n is an integer of from 4 to 14, most preferably from 5 to 10. Examples of aliphatic hydrocarbon solvents having this general formula or containing a substantial proportion of aliphatic hydrocarbon solvents having this general formula are hexane, kerosene, petroleum spirit and petroleum ether (preferably that fraction boiling within the range of from 60° to 80° C.). The most preferred solvent of this group is industrial hexane which usually contains n-hexane and related solvents. A typical example of industrial hexane, as employed in the Examples as hereinafter described, is supplied as a 62° to 68° C. boiling petroleum fraction, which on chromatographic analysis was shown to contain 25 to 30% by weight of n-hexane, 30 to 40% by weight of 2- and 3-methyl pentane, the balance consisting essentially of n-pentane and certain iso-pentanes.

When the non-polar solvent is an aromatic hydrocarbon preferably it is a benzenoid hydrocarbon. Examples of benzenoid hydrocarbons are benzene, toluene and xylene.

Further examples of suitable water-immiscible non-polar solvents are chlorinated hydrocarbons, such as carbon tetrachloride and chloroform, and dialkyl ethers, such as diethyl ether.

The dipolar aprotic solvent to be employed in the process of the invention as a medium for saponification of fatty matter is one which, according to Parker in Chemical Reviews 69 No. 1, February 1969 at page 2, has a dielectric constant above 15. The preferred dipolar aprotic solvent is acetone, which has a dielectric constant of 20.7.

The first step in the process of the invention is the extraction of fatty matter from dewatered sludge with the water-immiscible non-polar solvent.

The extraction can be carried out on a batch, continuous or batch-continuous, e.g. countercurrent, basis by contacting the dewatered sludge with the non-polar solvent, preferably with agitation, to ensure efficient extraction by the solvent of the fatty matter present in the sludge.

The temperature of extraction is preferably at or near the boiling point of the solvent used, or its azeotropic mixture with water, although a lower temperature can be employed.

In batch extraction, the duration of extraction is usually not more than 3 hours and is preferably from 1 to 3 hours. The temperature and duration of extraction are generally selected to ensure efficient extraction with the minimum of consumption of energy. In general, it can be stated that the duration and temperature of extraction should be appropriate for the extraction of fatty matter from sludge in both an efficient and economic manner.

The sludge can be re-extracted several times if desired to achieve a more complete recovery of fatty matter. The non-polar solvent employed can be recycled for this purpose.

The amount of solvent required to effect complete or near-complete extraction of fatty matter will depend on a number of factors, such as the origin, nature and solids content of the sludge, the temperature of extraction and the duration of contact of solvent with sludge and the method of extraction adopted, but as a general guide, it can be stated that an effective amount by weight of solvent to employ will be from 1 to 10 times by weight that of the sludge to be extracted. The solvent can be recovered and re-used repeatedly.

The solvent extraction will generally contain glycerides, esters, free fatty acids and possibly other fatty matter. Unsaponifiable matter such as long chain alcohols and ketones can also be present in the solvent extract. However, the amount of unsaponified matter and free fatty acids present will be dependent on the origin and history of the sludge employed as the starting material.

The second step in the process of the invention is the subsequent saponification of the fatty matter extracted with the non-polar solvent. This can be achieved firstly by evaporation or distillation of the non-polar solvent to leave a residue of fatty material (also known as "grease"), and secondly by saponification in the presence of the dipolar aprotic solvent.

Saponification of the extracted fatty matter can be achieved by dispersing the fatty matter in the dipolar aprotic solvent and heating, preferably at a temperature at or near the boiling point of the dipolar aprotic solvent, and agitating the dispersion with added alkali at a ratio of at least 0.5 parts by weight dipolar aprotic solvent to 1 part by weight fatty matter. Preferably the ratio of dipolar aprotic solvent to fatty matter is at least 2:1, most preferably at least 5:1 on a weight basis.

It is also possible to include with the dipolar aprotic solvent a proportion of a non-polar solvent to aid solution of fatty matter which does not readily dissolve in the dipolar aprotic solvent. When a non-polar solvent is employed in this way it can be added to the dipolar aprotic solvent-grease mixture before saponification is initiated, or alternatively, removal of the non-polar solvent employed in the first step in the process from the extracted grease can be terminated prematurely so that a proportion of this non-polar solvent remains with the grease. The amount of non-polar solvent expressed as a weight percentage of extracted grease than can be employed in the second step in the process can accordingly be up to 20%, preferably from 5 to 10%.

The preferred alkali for saponification is either sodium hydroxide or calcium hydroxide, depending upon whether sodium or calcium soaps are the desired end product.

After saponification is complete, the end product is a fine grained soap usually containing from 15 to 20% water, and it can readily be separated from unsaponifiable matter remaining in solution in the dipolar aprotic solvent, for example by filtration. The dipolar aprotic solvent can be separated by distillation and re-used.

The invention is illustrated by the following Examples.

EXAMPLE 1

This Example illustrates a process for the extraction of fatty matter ("grease") from co-settled sludge and its subsequent saponification in a dipolar aprotic solvent.

PRELIMINARY DRYING STEP

Co-settled sludge having a solids content of 4% by weight was employed in this Example.

Filter cake was prepared from the co-settled sludge by addition of a dose of 0.1% by weight ZETAG 92 polyelectrolyte based on dry sludge solids, to condition and flocculate the solid matter. The flocculated sludge was then filtered on a belt press to provide a sludge filtered cake (dewatered sludge) having a solids content of 26.3% by weight. 29.6% by weight of the solids of this dewatered sludge were soluble in technical grade hexane.

PROCESS STEP 1

120 kg of the filter cake was tipped into a 1 m³ vessel equipped with an anchor agitator and driven by a 2 hp motor. The vessel was sealed and purged with 3 m³ of nitrogen which was sufficient to displace the majority of air present in the reactor vessel. 240 kg of technical grade hexane, as the water-immiscible non-polar solvent, was then pumped into the vessel. The inert atmosphere provided by the nitrogen was employed as a safety measure to reduce fire hazard.

The vessel contents were agitated and heated to 58° C. by steam heating using a jacket around the vessel. The temperature of 58° C. was maintained for 3 hours.

Using cooling water at ambient temperature in the vessel jacket, the vessel contents were then cooled to 30° C. to reduce the volatility of the solvent if a leak or spillage should occur in subsequent filtration.

The solvent extract (hexane miscella) was drained out of the vessel in the following ways. Nitrogen was bled through the bottom run-off valve on the vessel, the valve being cracked open after agitation had ceased. In this way, passages were formed in the solids which rested on the bottom of the vessel, the hexane miscella being at the top. When the nitrogen bleed was stopped, miscella freely drained through the passages and was fed via centrifugal positive displacement pump to a horizontal plate pressure filter. The filter was used to polish the miscella before distillation and recovery of fatty substances.

After this extraction, the hexane-soluble substances remaining in the residue had been reduced to 9.2% by weight: this consisted of 5.8% by weight fatty substances which had not been extracted from the sludge and 3.4% by weight contributed by hexane miscella remaining in the vessel after drainage of the bulk of the miscella.

The extraction was repeated a second time using 238 kg technical grade hexane. The hexane-soluble substances remaining in the sludge had been further reduced by this means to 3.7% by weight, 3% of which was material unextracted from the sludge and 0.7% contributed by the residual miscella remaining in the vessel. A final extraction stage used 206 kg technical grade hexane. The hexane-soluble substances remaining in the residual sludge had been thereby reduced to 2.7% by weight. This final extraction stage was effectively a washing operation.

The total fatty substances recovered in this way had the following analysis:
Unsaponifiable material: 21%
Saponifiable material: 79%
Acid value: 139.4
Saponification value: 181.3
Iodine value: 41.9

PROCESS STEP 2

Hexane was removed completely by distillation from the combined hexane extracts to yield 100 g hexane-soluble fatty matter ("grease"). The grease was then dispersed in 500 ml of acetone as the dipolar aprotic solvent and heated with stirring at a temperature of 56° C. The weight ratio of acetone to grease was accordingly 4:1.

21 ml 40% by weight aqueous sodium hydroxide was then added, and 5 g of sodium chloride was added 5 minutes later. Saponification was allowed to proceed for 30 minutes.

The soap so formed had a grained appearance and was easily separated from the solvent which itself contained unsaponifiable matter. The soap was washed for a further 30 minutes with 500 ml acetone at 56° C.

98% by weight of the saponifiable matter in the grease was converted to sodium soap having a moisture content of 18% by weight. The final level of unsaponifiable matter was 7% by weight of the total fatty matter, 93.3% by weight of the total fatty matter being recoverable as soap.

| Fatty Acid Analysis of Saponifiable Material | | | |
|---|---|---|---|
| | % w/w | | % w/w |
| $C_6$ | 1.2 | $C_{16}$ | 45.4 |
| $C_8$ | 1.8 | $C_{16:1}$ | 1.7 |
| $C_{10}$ | 9.0 | $C_{18}$ | 14.0 |
| $C_{10:1}$ | 1.7 | $C_{18:1}$ | 9.8 |
| $C_{12}$ | 2.5 | $C_{18:2}$ | 1.4 |
| $C_{14}$ | 8.6 | $C_{18:3}$ | 0.9 |
| $C_{14:1}$ | 0.7 | $C_{20}$ | 0.6 |
| $C_{14:2}$ | 0.5 | $C_{22}$ | 0.2 |

EXAMPLE 2

This Example illustrates a process similar to that described in Example 1, except that some of the nonpolar solvent employed to extract grease from dewatered sludge was deliberately retained in the grease when subsequent saponification in a dipolar aprotic solvent was carried out.

The procedure described in Example 1 up to Process Step 1 was repeated.

In process step 2, the bulk of the hexane was removed by distillation to leave 5% by weight hexane in the grease. 100 g of this grease was dissolved in 200 ml acetone as the dipolar aprotic solvent and heated with stirring at a temperature of 56° C. The weight ratio of acetone to grease was accordingly 1.6:1.

29 ml 50% by weight aqueous sodium hydroxide was then added, with 5 g sodium chloride added 5 minutes later. Saponification was allowed to proceed for ½ hour.

The soap so formed had a finer grained appearance than in Example 1, where the grease contained fatty matter which did not go into solution. The soap was washed for 30 minutes with a further 20 ml portions of acetone at 56° C. In total, the soap was washed nine times.

All of the saponifiable material in the grease was by this procedure converted to sodium soap having a moisture content of 18%. The final level of unsaponifiables was 1.3% of the total fatty matter, 94% of the total fatty matter being recoverable as soap.

EXAMPLE 3

This Example illustrates a process similar to that described in Example 2, except that calcium fatty acid soaps are formed in process step 2 instead of sodium soaps.

The procedure described in Example 1 up to process step 1 was repeated.

In process step 2, the bulk of the hexane was removed by distillation to leave 5% by weight hexane in the grease as described in Example 2.

100 g of grease containing 5 g hexane was dissolved in 100 ml acetone as the dipolar aprotic solvent and heated with stirring at a temperature of 56° C. The weight ratio of acetone to grease was accordingly 0.8:1.

12 g anhydrous calcium hydroxide was then added and saponification was allowed to proceed for 3 hours.

The soap so formed had a fine grain appearance. Three acetone washings with a total of 250 ml of acetone at 56° C. for 30 minutes were made as described in Example 2.

90% of the saponification material in the grease was converted to calcium soap, 18% of ester materials being saponified. The final level of unsaponifiables was 4.3% of the total fatty matter, 83% of the total fatty matter being recoverable as soap.

What is claimed is:
1. A process for the production of fatty acid soaps from sludge, which comprises the steps of:

(i) extracting sludge, having a solids content of at least 15% by weight, with a non-polar solvent to provide an extract comprising fatty matter; and (ii) saponifying the fatty matter in the presence of a dipolar aprotic solvent having a dielectric constant of at least 15 to produce fatty acid soaps.

2. The process of claim 1, wherein the sludge has a solids content of from 25 to 50% by weight.

3. The process of claim 1, comprising the additional preliminary steps of heating sludge to a temperature of at least 100° C. and subsequently separating the heated sludge to provide sludge having a solids content of at least 15% by weight.

4. The process of claim 1, comprising the additional preliminary steps of contacting sludge with a flocculating agent and subsequently separating the flocculated sludge to provide sludge having a solids content of at least 15% by weight.

5. The process of claim 1, wherein the non-polar solvent is a hydrocarbon having from 4 to 14 carbon atoms in the molecule.

6. The process of claim 5, wherein the hydrocarbon is an aliphatic hydrocarbon chosen from hexane, kerosene, petroleum spirit, petroleum ether and mixtures thereof.

7. The process of claim 5, wherein the hydrocarbon is an aromatic hydrocarbon chosen from benzene, toluene, xylene and mixtures thereof.

8. The process of claim 1, wherein the dipolar aprotic solvent is acetone.

9. The process of claim 1, wherein the fatty acid soaps so obtained comprise sodium fatty acid soaps.

10. The process of claim 1, wherein the fatty acid soaps so obtained comprise calcium fatty acid soaps.

* * * * *